United States Patent
Yamada et al.

(10) Patent No.: US 8,234,040 B2
(45) Date of Patent: Jul. 31, 2012

(54) AIR-CONDITIONER CONTROLLING DEVICE

(75) Inventors: Kazunao Yamada, Toyota (JP); Yusuke Mizuno, Anjo (JP); Tadashi Sakai, Obu (JP)

(73) Assignee: DENSO CORPORATION, Kariya (JP)

( * ) Notice: Subject to any disclaimer, the term of this patent is extended or adjusted under 35 U.S.C. 154(b) by 175 days.

(21) Appl. No.: 12/662,492

(22) Filed: Apr. 20, 2010

(65) Prior Publication Data
US 2010/0292893 A1    Nov. 18, 2010

(30) Foreign Application Priority Data
May 18, 2009    (JP) .................... 2009-119581

(51) Int. Cl.
*G06F 7/00*    (2006.01)
(52) U.S. Cl. ............................. 701/36; 701/1
(58) Field of Classification Search .................. None
See application file for complete search history.

(56) References Cited

U.S. PATENT DOCUMENTS

| | | | | |
|---|---|---|---|---|
| 4,642,770 A | * | 2/1987 | Shirley | 701/36 |
| 5,070,931 A | * | 12/1991 | Kalthoff et al. | 165/11.1 |
| 5,511,724 A | * | 4/1996 | Freiberger et al. | 236/49.3 |
| 5,553,661 A | * | 9/1996 | Beyerlein et al. | 165/203 |
| 6,078,853 A | * | 6/2000 | Ebner et al. | 701/36 |
| 6,298,911 B1 | * | 10/2001 | Volz et al. | 165/202 |
| 6,859,687 B2 | * | 2/2005 | Obradovich et al. | 701/1 |
| 7,062,362 B2 | * | 6/2006 | Obradovich et al. | 701/1 |
| 7,181,318 B2 | * | 2/2007 | Wang et al. | 700/278 |
| 7,246,499 B2 | * | 7/2007 | Pham et al. | 62/161 |
| 2002/0088246 A1 | | 7/2002 | Bureau et al. | |
| 2002/0125332 A1 | * | 9/2002 | Aoki et al. | 236/49.3 |
| 2005/0192724 A1 | * | 9/2005 | Hendry | 701/36 |
| 2006/0288727 A1 | | 12/2006 | Aikawa et al. | |

FOREIGN PATENT DOCUMENTS

| | | |
|---|---|---|
| JP | A-2004-147460 | 5/2004 |
| JP | A-2005-31071 | 2/2005 |
| JP | A-2006-262684 | 10/2006 |
| JP | A-2007-143267 | 6/2007 |
| JP | A-2007-269275 | 10/2007 |

OTHER PUBLICATIONS

Office Action mailed Feb. 15, 2011 in corresponding Japanese Patent Application No. 2009-119581 (English translation enclosed).

* cited by examiner

*Primary Examiner* — Khoi Tran
*Assistant Examiner* — Bhavesh V Amin
(74) *Attorney, Agent, or Firm* — Posz Law Group, PLC

(57) ABSTRACT

An air-conditioner controlling device includes a first control unit and a second control unit. The first control unit changes an air-conditioner operation from a standard to an energy-saving, when a vehicle is determined to be located in a target area. The target area is defined by a predetermined interval from a target point of the vehicle. The second control unit changes the air-conditioner operation from the energy-saving to the standard, after the first control unit changes the air-conditioner operation from the standard to the energy-saving, in a case that a destination of the vehicle is estimated to be different from the target point.

11 Claims, 3 Drawing Sheets

AIR-CONDITIONER CONTROLLING DEVICE

CROSS REFERENCE TO RELATED APPLICATION

This application is based on Japanese Patent Application No. 2009-119581 filed on May 18, 2009, the disclosure of which is incorporated herein by reference in its entirety.

BACKGROUND OF THE INVENTION

1. Field of the Invention

The present invention relates to an air-conditioner controlling device.

2. Description of Related Art

JP-A-2007-269275 discloses an air-conditioner controlling device mounted on a vehicle. The device searches a route from a departure place to a destination place. While the vehicle travels toward the destination place, the device changes an operation mode of an air-conditioner from a standard mode to an energy-saving mode, when a condition for changing the operation mode is satisfied. Thus, consumption energy of the air-conditioner can be reduced.

If the destination place is changed from a first place to a second place during a driving, the vehicle travels toward the second place after passing through the first place. In this case, if the operation mode of the air-conditioner is not returned to the standard mode, comfortableness in the vehicle may not be maintained.

SUMMARY OF THE INVENTION

In view of the foregoing and other problems, it is an object of the present invention to provide an air-conditioner controlling device.

According to an example of the present invention, an air-conditioner controlling device to control an air-conditioner of a vehicle includes a specifying portion, a determining portion, a first control unit, an estimating portion, a second control unit. The specifying portion specifies a present position of the vehicle. The determining portion determines whether the vehicle is located in a target area based on the specified present position. The target area is defined by a predetermined interval from a target point of the vehicle. The first control unit changes an operation state of the air-conditioner from a standard mode to an energy-saving mode so as to reduce a consumption electricity of the air-conditioner, when the determining portion determines the vehicle to be located in the target area. The estimating portion estimates a destination of the vehicle. The second control unit changes the operation state of the air-conditioner from the energy-saving mode to the standard mode, after the first control unit changes the operation state from the standard mode to the energy-saving mode, in a case that the estimated destination is different from the target point.

Accordingly, consumption energy of the air-conditioner can be reduced, and comfortableness of the vehicle can be maintained.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT (First Embodiment)

Figure 1:
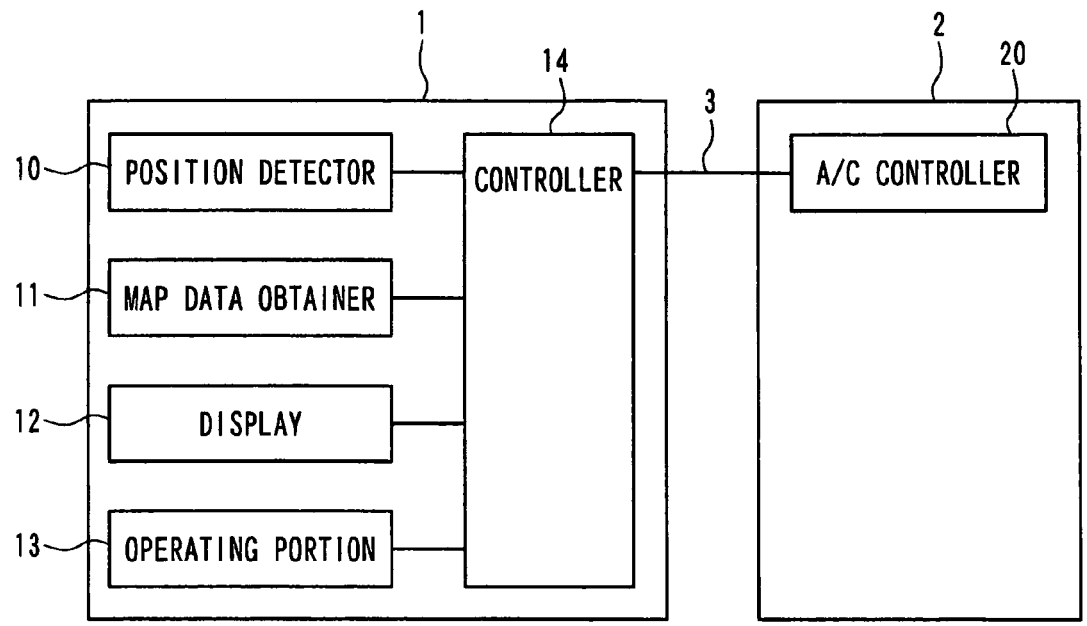
FIG. 1 is a block diagram illustrating an air-conditioner controlling device according to a first embodiment.

A navigation device 1 is mounted on a vehicle, and controls an air-conditioner 2 of the vehicle. The navigation device 1 may correspond to an air-conditioner controlling device. As shown in FIG. 1, the navigation device 1 is connected to an air-conditioner (A/C) controller 20 of the air-conditioner 2 through a connection cable 3.

The navigation device 1 includes a position detector 10, a map data obtaining portion 11, a display device 12, an operating portion 13 and a controller 14.

The position detector 10 includes a geomagnetic sensor, a gyroscope, a distance sensor and a global positioning system (GPS) receiver (not shown). Information for specifying a present position of the vehicle is input into the controller 14 from the position detector 10.

The map data obtaining portion 11 is a device to obtain map data, and the map data is memorized in a memory such as a hard disk drive, DVD or CD. The map data contains road data, map-matching data, background data, facilitation data, and so on. The road data represents identification information of each link, road distance, road kind, road width, road shape, road name, lane number, and so on. The map-matching data is provided for raising accuracy for detecting the position. The background data represents position, shape and name, relative to river, lake, sea, rail, facilitation and so on. The facilitation date represents name, address, facilitation kind, and telephone number, relative to facilitations.

The display device 12 has a display such as a liquid crystal. An image is displayed on the display device 12, and the displayed image corresponds to an image signal input from the controller 14.

The operating portion 13 has a touch-sensitive switch overlap with a front face of the display device 12, or a mechanical switch arranged around the display device 12. A user performs a switch operation, and a signal corresponding to the switch operation is output from the operating portion 13 into the controller 14.

The controller 14 is a computer having CPU, RAM, ROM, hard disk drive, I/O and so on. The CPU performs a variety of processes in accordance with program memorized in the ROM.

The controller 14 specifies a position of the vehicle based on information input from the position detector 10, due to a vehicle position specifying process. The controller 14 searches a destination place based on an operation of the user, due to a destination searching process. The controller 14 searches a route from a departure place to the destination place, due to a route searching process. The controller 14 performs a route guidance based on the route, due to a route guiding process. The controller 14 determines the vehicle to be out of the route or not, due to a separation determining process. The controller 14 controls the air-conditioner 2 by sending a signal, due to an air-conditioner controlling process, and the signal corresponds to an operation input into the operating portion 13.

The A/C controller 20 of the air-conditioner 2 controls air-conditioning in a passenger compartment of the vehicle based on a signal input from the navigation device 1. Specifically, the controller 20 controls air-conditioning based on a switch operation relative to a temperature setting switch, an air amount controlling switch, an air-conditioner (A/C) switch, and an outside air introducing switch.

The A/C controller 20 controls a fan (not shown) based on a switch operation relative to the air amount controlling switch, thereby an amount of air blown from the air-conditioner 2 is controlled. The A/C controller 20 controls a compressor (not shown) based on a switch operation relative to the A/C switch, thereby the air-conditioner 2 is turned on or off.

The controller 14 of the navigation device 1 determines a stop point of the vehicle based on a position of the vehicle and a vehicle stop information.

The stop point is memorized in the hard disk drive as a destination candidate point for the following driving or the next driving time, due to a destination candidate memorizing process.

Figure 2:
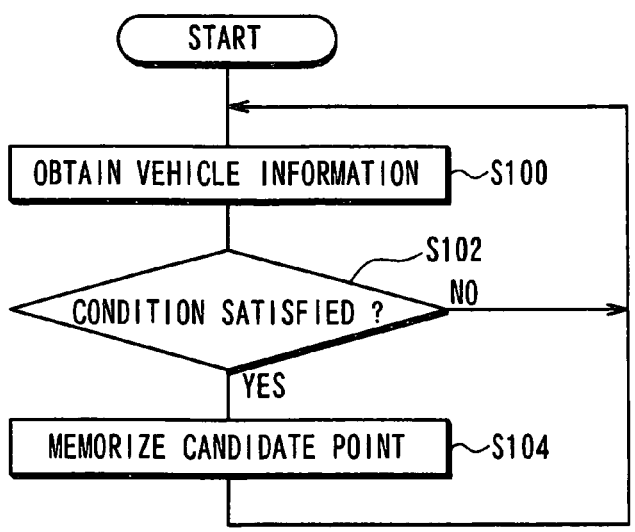
FIG. 2 is a flowchart illustrating a process for memorizing a destination candidate point.

FIG. 2 shows a flowchart of the destination candidate memorizing process. When an ignition switch of the vehicle is turned on, the navigation device 1 is activated, and the controller 14 performs the destination candidate memorizing process of FIG. 2.

The controller 14 obtains the vehicle stop information (S100). The vehicle stop information may correspond to a vehicle speed information.

The controller 14 determines a destination condition to be satisfied or not (S102). For example, when the vehicle speed information is maintained to be 0 km/h for a predetermined period such as 5 minutes, the controller 14 determines the destination condition to be satisfied.

Figure 3:
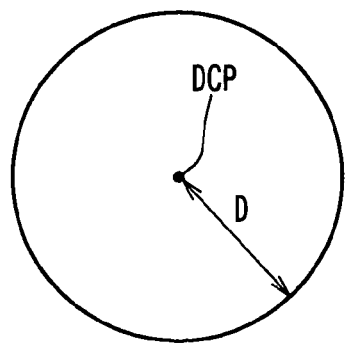
FIG. 3 is a diagram illustrating a nearby area having an interval from the destination candidate point.

When the vehicle speed information is not maintained to be 0 km/h for the predetermined period (NO at S102), the controller 14 returns to S100. In contrast, when the vehicle speed information is maintained to be 0 km/h for the predetermined period (YES at S102), the controller 14 memorizes position information such as latitude or longitude of the vehicle stop point into the hard, disk drive as position information of destination candidate point (S104). Specifically, as shown in FIG. 3, a nearby map is formed to define a predetermined candidate area having a distance D from a destination candidate point DCP. The controller 14 memorizes the nearby map in the hard disk drive, and returns to S100.

Due to the destination candidate memorizing process, plural vehicle stop points are memorized in the hard disk drive as the destination candidate points.

When the vehicle goes close to a destination candidate point memorized in the hard disk drive, the controller 14 changes an operation state of the air-conditioner 2 from a standard mode to a stop mode before the vehicle arrives at the destination candidate point. Further, after the operation state of the air-conditioner 2 is changed from the standard mode to the stop mode, when the controller 14 estimates a destination of the vehicle to be different from the candidate point, the controller 14 changes the operation state of the air-conditioner 2 from the stop mode to the standard mode.

Figure 4:
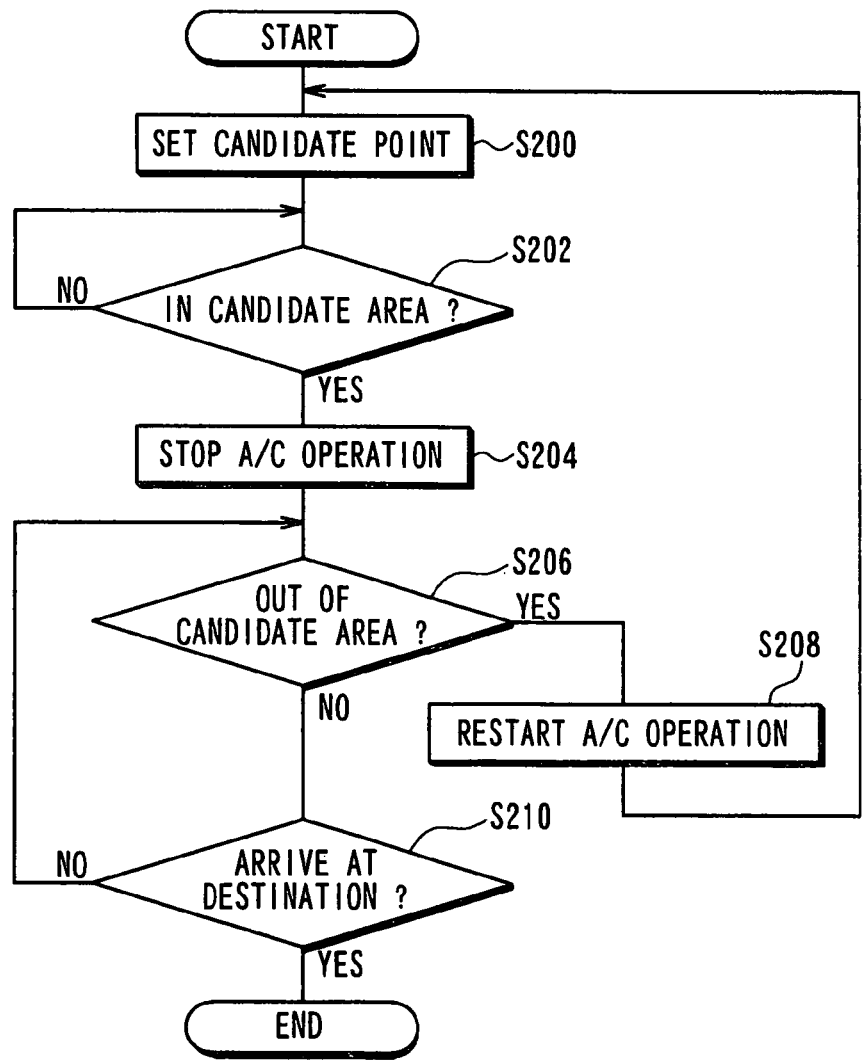
FIG. 4 is a flowchart illustrating a process for changing an operation state of an air-conditioner.

FIG. 4 shows a flowchart of the above-described operation state changing process. When an ignition switch of the vehicle is turned on, the navigation device 1 is activated. The controller 14 periodically performs the operation state changing process of FIG. 4 parallel with the destination candidate memorizing process of FIG. 2.

At S200, a destination candidate point most adjacent to the vehicle is specified. Specifically, the destination candidate point is extracted from the hard disk drive in a manner that a linear distance between the vehicle and the destination candidate point becomes shortest.

At S202, it is determined whether the vehicle goes close to the candidate, point. Specifically, the controller 14 performs the determination based on the linear distance. When the linear distance is equal to or smaller than a predetermined value, the vehicle is determined to be in a predetermined candidate area. For example, the determination is performed based on the nearby map of FIG. 3.

When the vehicle is not close to the destination candidate point (NO at S202), the controller 14 repeats the process of S202.

When the vehicle is close to the destination candidate point (YES at S202), the controller 14 stops the operation of the air-conditioner 2 at S204. Specifically, the controller 14 outputs a signal indicating a stop of the air-conditioner 2 into the A/C controller 20, such that the operation state of the air-conditioner 2 is changed from the standard mode into the stop mode. Therefore, the air-conditioner 2 is turned off, and air-sending is stopped.

Figure 5:
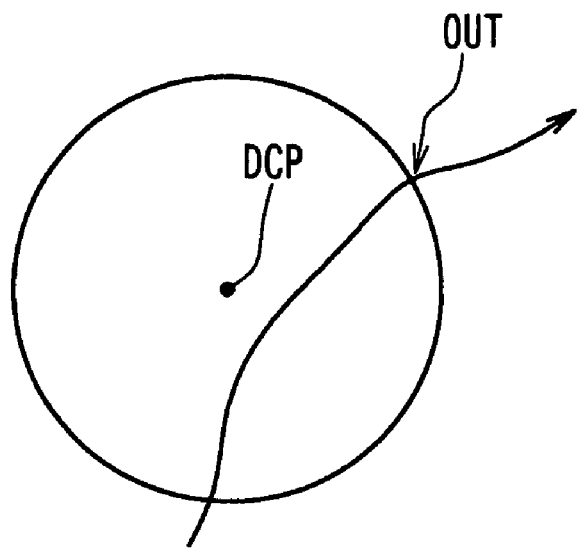
FIG. 5 is a diagram illustrating a vehicle movement moving out of the nearby area.

At S206, it is determined whether the vehicle goes out of the candidate area. As shown in FIG. 5, when the vehicle goes out of the candidate area defined by a uniform distance from the destination candidate point DCP, the vehicle is determined to leave the destination candidate point.

When the vehicle is in the candidate area (NO at S206), the vehicle is determined to arrive at the destination or not at S210. The determination of S210 is performed based on a signal indicating that a gear shift lever of the vehicle is changed to a parking (P) or not.

When the shift lever is not positioned at the parking (NO at S210), the controller 14 returns to S206.

When the vehicle is out of the candidate area before arriving at the destination (YES at S206), the controller 14 restarts the operation of the air-conditioner 2 at S208 and returns to S200. Specifically, a signal indicating an operation of the air-conditioner 2 is input into the A/C controller 20. Thus, the air-conditioner 2 is turned on, and air-sending is restarted. Thus, the operation state of the air-conditioner 2 is changed from the stop mode into the standard state.

When the vehicle is again located in another candidate area defined by a predetermined distance from another destination candidate point memorized in the hard disk drive (YES at S202), the controller 14 stops the air-conditioner 2 (S204).

When the vehicle continues to stay in the candidate area (NO at S206), and when the shift lever of the vehicle is positioned to the parking (YES at S210), the process of FIG. 4 is ended.

According to the first embodiment, the vehicle stop points are memorized in the hard disk drive as the destination candidate points. The operation of the air-conditioner 2 is stopped when the vehicle is determined to be located in the candidate area based on the present position of the vehicle and the destination candidate point memorized in the hard disk drive. The candidate area is defined by a predetermined interval from a destination candidate point. Thus, energy consumption of the air-conditioner 2 can be reduced.

Further, the operation of the air-conditioner 2 is restarted when the destination of the vehicle is estimated to be different from the destination candidate point. For example, if the destination is changed from a first place to a second place in a driving time, and if the vehicle travels toward the second place after passing through the first place, the restarting operation of the air-conditioner 2 is unnecessary. Thus, the air-conditioner 2 can be turned on or off more comfortably.

The operation of the air-conditioner 2 is stopped when the vehicle is determined to be located in the candidate area based on the destination candidate point memorized in the hard disk drive. Therefore, energy consumption of the air-conditioner 2 can be reduced without an operation for setting the destination, and the air-conditioner 2 can be turned on or off more comfortably.

When the vehicle is determined to be located in a candidate area again after the operation of the air-conditioner 2 is restarted, the operation of the air-conditioner 2 is stopped. Therefore, the air-conditioner 2 can be automatically stopped without an operation for setting a new destination, and energy consumption of the air-conditioner 2 can be reduced.

(Second Embodiment)

Figure 6:
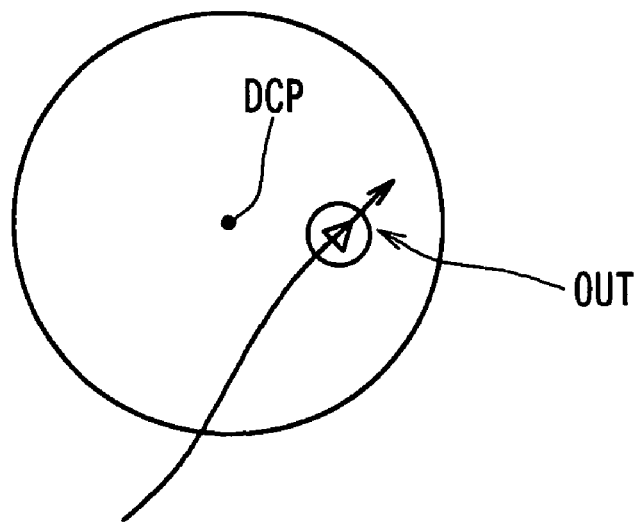
FIG. 6 is a diagram illustrating a vehicle movement separating from a destination candidate point according to a second embodiment.

In a second embodiment, as shown in FIG. 6, a controller 14 determines a vehicle to be out of a candidate area when the vehicle is determined to travel in a direction separating from a destination candidate point DCP based on a driving trace of the vehicle. For example, the controller 14 determines the vehicle to be out of the candidate area when the vehicle is determined to travel toward a direction opposite from the destination candidate point DCP, while the vehicle is traveling through a road connected to the destination candidate point DCP.

(Other Embodiment)

The operation of the air-conditioner 2 is stopped at S204 of FIG. 4. Alternatively, an operation state of the air-conditioner 2 may be changed from a standard mode to an energy-saving mode at S204 of FIG. 4. Similarly, at S208 of FIG. 4, the operation state of the air-conditioner 2 may be changed from the energy-saving mode to the standard mode.

For example, a switch of the air-conditioner 2 is turned off in a manner that air-sending state is changed into air-stopped state. Alternatively, the switch of the air-conditioner 2 is turned off in a manner that air-sending state is maintained. Alternatively, air-sending state is changed into air-stopped state without an operation for the switch, in a case that the switch of the air-conditioner 2 has been already turned off. Thus, energy consumption of the air-conditioner 2 can be reduced.

During a cooling operation, if the switch of the air-conditioner 2 is turned off in a manner that air-sending state is maintained, cooled air continues to be blown out of the air-conditioner 2 for a while. Therefore, comfortableness of the vehicle can be maintained for a relatively long time, while the energy consumption is reduced.

During a heating operation, if the switch of the air-conditioner 2 is turned off in a manner that air-sending state is maintained, a high temperature of the passenger compartment of the vehicle can be maintained for a while. Therefore, comfortableness of the vehicle can be maintained for a relatively long time, while the energy consumption is reduced.

The vehicle stop points may not be memorized in the memory. In this case, the operation of the air-conditioner 2 is restarted when the destination of the vehicle is estimated to be different from a target point of the vehicle. For example, in a case that a route is searched from the present position to a destination, when the vehicle is determined to be out of the route at S206, the operation of the air-conditioner 2 is restarted. Alternatively, when a guiding portion receives an indication for stopping a guiding of the route, the operation of the air-conditioner 2 is restarted.

The vehicle is determined to be located in the candidate area or not by using the linear distance between the vehicle and the destination candidate point. Alternatively, the determination may be performed by using an actual road distance between the vehicle and the destination candidate point. Alternatively, the determination may be performed by using a time necessary for the vehicle to arrive at the destination candidate point.

The air-conditioner 2 may be a coolness storage air-conditioner. A coolness storage member of the coolness storage air-conditioner is cooled in a driving time so as to store coolness. Therefore, cooled air can be supplied for the vehicle, even while an engine of the vehicle is stopped.

In a case that a route is searched from the present position to a destination, when the vehicle is determined to be out of the searched route, the vehicle is determined to be out of the candidate area. Further, if a guiding portion receives an indication for stopping a guiding of the route, the vehicle is determined to be out of the candidate area.

The vehicle stop information is not limited to the vehicle speed information at S100. For example, the present position of the vehicle may be obtained as the vehicle stop information at S100. In this case, the destination condition is satisfied when the present position is maintained for a predetermined period at S102.

Alternatively, the destination conditioner may be satisfied if a place is set as the destination by a user operation. Alternatively, the destination conditioner may be satisfied if a place at which a ETC card is removed is defined as the destination.

Further, the vehicle stop information may be a signal indicating that the shift lever of the vehicle is positioned at a reverse (R) range, or a signal indicating that a parking brake of the vehicle is operated.

Such changes and modifications are to be understood as being within the scope of the present invention as defined by the appended claims.

The vehicle position specifying process may correspond to a specifying portion to specify a present position of the vehicle. The process of S100 may correspond to an obtaining portion to obtain vehicle stop information. The process of S104 may correspond to a memorizing portion to memorize the destination candidate point. The processes of S202, S204 may correspond to a first control unit. The processes of S206, S208 may correspond to a second control unit. The route searing process may correspond to a searching portion to search a route from the present position to the destination. The route guiding process may correspond to a guiding portion to guide the route.

What is claimed is:

1. An air-conditioner controlling device to control an air-conditioner of a vehicle comprising:
   a specifying portion to specify a present position of the vehicle;
   a determining portion to determine whether the vehicle is located in a target area based on the present position, the target area being defined by a predetermined interval from a target point of the vehicle;
   a first control unit to change an operation state of the air-conditioner from a standard mode to an energy-saving mode so as to reduce a consumption electricity of the air-conditioner, when the determining portion determines the vehicle to be located in the target area;
   an estimating portion to estimate a destination of the vehicle; and
   a second control unit to change the operation state of the air-conditioner from the energy-saving mode to the standard mode, after the first control unit changes the operation state from the standard mode to the energy-saving mode, in a case that the estimated destination is different from the target point.

2. The air-conditioner controlling device according to claim 1, further comprising:
a searching portion to search a route from the present position to the destination, wherein
the estimated destination is different from the target point, when the vehicle is determined to be out of the route.

3. The air-conditioner controlling device according to claim 1, further comprising:
a searching portion to search a route from the present position to the destination; and
a guiding portion to guide the route, wherein
the estimated destination is different from the target point, when the guiding portion receives an indication to stop the guiding.

4. The air-conditioner controlling device according to claim 1, further comprising:
an obtaining portion to obtain vehicle stop information; and
a memorizing portion to specify a stop point of the vehicle based on the present position and the vehicle stop information, and to memorize the stop point of the vehicle as a candidate point of the destination, wherein
the determining portion determines whether the vehicle is located in a candidate area based on the present position and the candidate point, the candidate area being defined by a predetermined interval from the candidate point, and
the second control unit changes the operation state of the air-conditioner from the energy-saving mode to the standard mode, when the estimated destination is different from the candidate point.

5. The air-conditioner controlling device according to claim 4, wherein
the estimated destination is different from the candidate point, when the vehicle is determined to be out of the candidate area.

6. The air-conditioner controlling device according to claim 4, wherein
the estimated destination is different from the candidate point, when the vehicle is determined to be traveling in a direction separating from the candidate point.

7. The air-conditioner controlling device according to claim 4, wherein
the memorizing portion memorizes a plurality of the stop points as a plurality of the candidate points, and
the first control unit again changes the operation state of the air-conditioner from the standard mode to the energy-saving mode, after the second control unit changes the operation state from the energy-saving mode to the standard mode, in a case that the determining portion determines the vehicle to be located in at least one of the candidate areas.

8. The air-conditioner controlling device according to claim 1, wherein
the first control unit changes the operation state of the air-conditioner from a first air-sending mode to a second air-sending mode, when the determining portion determines the vehicle to be located in the target area,
the first air-sending mode is defined by turning on a switch of the air-conditioner, and
the second air-sending mode is defined by turning off the switch of the air-conditioner.

9. The air-conditioner controlling device according to claim 1, wherein
the first control unit changes the operation state of the air-conditioner from an air-sending mode to an air-stopped mode, when the determining portion determines the vehicle to be located in the target area,
the air-sending mode is defined by turning off a switch of the air-conditioner, and
the air-stopped mode is defined by turning off the switch of the air-conditioner.

10. The air-conditioner controlling device according to claim 1, wherein
the predetermined interval defining the target area is defined by a predetermined distance from the target point.

11. The air-conditioner controlling device according to claim 1, wherein
the predetermined interval defining the target area is defined by a time period necessary for arriving at the target point.

* * * * *